United States Patent

Birdwell

[19]

[11] Patent Number: 6,041,359
[45] Date of Patent: Mar. 21, 2000

[54] DATA DELIVERY SYSTEM AND METHOD FOR DELIVERING COMPUTER DATA OVER A BROADCAST NETWORK

[75] Inventor: Kenneth J. Birdwell, Bellevue, Wash.

[73] Assignee: Microsoft Corporation, Redmond, Wash.

[21] Appl. No.: 08/871,655

[22] Filed: Jun. 9, 1997

[51] Int. Cl.$^7$ .................................................. G06F 15/16
[52] U.S. Cl. ........................................ 709/238; 709/226
[58] Field of Search ..................... 395/200.68, 200.56, 395/200.61, 200.47; 709/238, 226, 231, 217

[56] References Cited

U.S. PATENT DOCUMENTS

| | | | |
|---|---|---|---|
| 5,231,631 | 7/1993 | Buhrke et al. | 370/60 |
| 5,335,277 | 8/1994 | Harvey et al. | 380/20 |
| 5,359,367 | 10/1994 | Stockill | 348/552 |
| 5,499,243 | 3/1996 | Hall | 370/85.8 |
| 5,539,743 | 7/1996 | Amemiya et al. | 370/85.1 |
| 5,559,808 | 9/1996 | Kostreski et al. | 370/108 |
| 5,565,909 | 10/1996 | Thibadeau et al. | 348/9 |
| 5,625,864 | 4/1997 | Budow et al. | 455/4.2 |
| 5,650,831 | 7/1997 | Farwell | 348/734 |
| 5,666,293 | 9/1997 | Metz et al. | 395/200.5 |
| 5,686,954 | 11/1997 | Yoshinobu et al. | 348/13 |
| 5,689,081 | 11/1997 | Tsurumi | 84/609 |
| 5,706,048 | 1/1998 | Davis | 348/12 |
| 5,727,065 | 3/1998 | Dillon | 380/49 |
| 5,751,282 | 5/1998 | Girard et al. | 345/327 |
| 5,778,187 | 7/1998 | Monteiro et al. | 395/200.61 |
| 5,799,002 | 8/1998 | Krishnan | 370/234 |
| 5,801,753 | 9/1998 | Eyer et al. | 348/13 |
| 5,838,668 | 11/1998 | Okada et al. | 370/312 |
| 5,854,897 | 12/1998 | Radziewicz et al. | 395/200.54 |
| 5,878,033 | 3/1999 | Mouly | 370/312 |

OTHER PUBLICATIONS

Kashpureff.ORG Network Information Center, "Search Internet Drafts," @www.kashpureff.org.
Lixia Zhang et al, "RSVP; A New Resource Reservation Protcol" IEEE Network Magazine, Sep. 1993.
The MBone Session Agenda http://www.cilea.it/MBone/agenda.html, No Date.
VRML 97 MBone Broadcast Announcement Rem–Conf Archieve, Feb. 1997.
Mbone Web Site http://www.mbone.com, No Date.

*Primary Examiner*—Mehmet B. Geckil
*Attorney, Agent, or Firm*—Lee & Hayes, PLLC

[57] ABSTRACT

A data delivery system facilitates broadcast delivery of computer data and other content from multiple content servers to multiple clients. The servers are connected to a broadcast center via a bi-directional data network, such as an ATM network or an Ethernet. The data is served over the data network from the content servers to the broadcast center where it is broadcast over a broadcast network (i.e., satellite, RF, microwave, etc.) to the clients. The clients are equipped to receive broadcast transmissions from the broadcast center. Due to the unidirectional broadcast link, the clients are unable to communicate with the servers to acknowledge receipt or pre-reserve bandwidth over the data network. The broadcast center performs this task on behalf of the clients. To assure delivery of the data from the servers over the data network to the broadcast center for retransmission, the content servers generate requests for reservation of bandwidth on the data network for an upcoming time period and submit the requests over the data network to the broadcast center prior to the time period. The broadcast network schedules reservations of the bandwidth for the upcoming time period and, when the time period arrives, reserves the bandwidth at the time the communication link between the server and the broadcast center is being established.

37 Claims, 4 Drawing Sheets

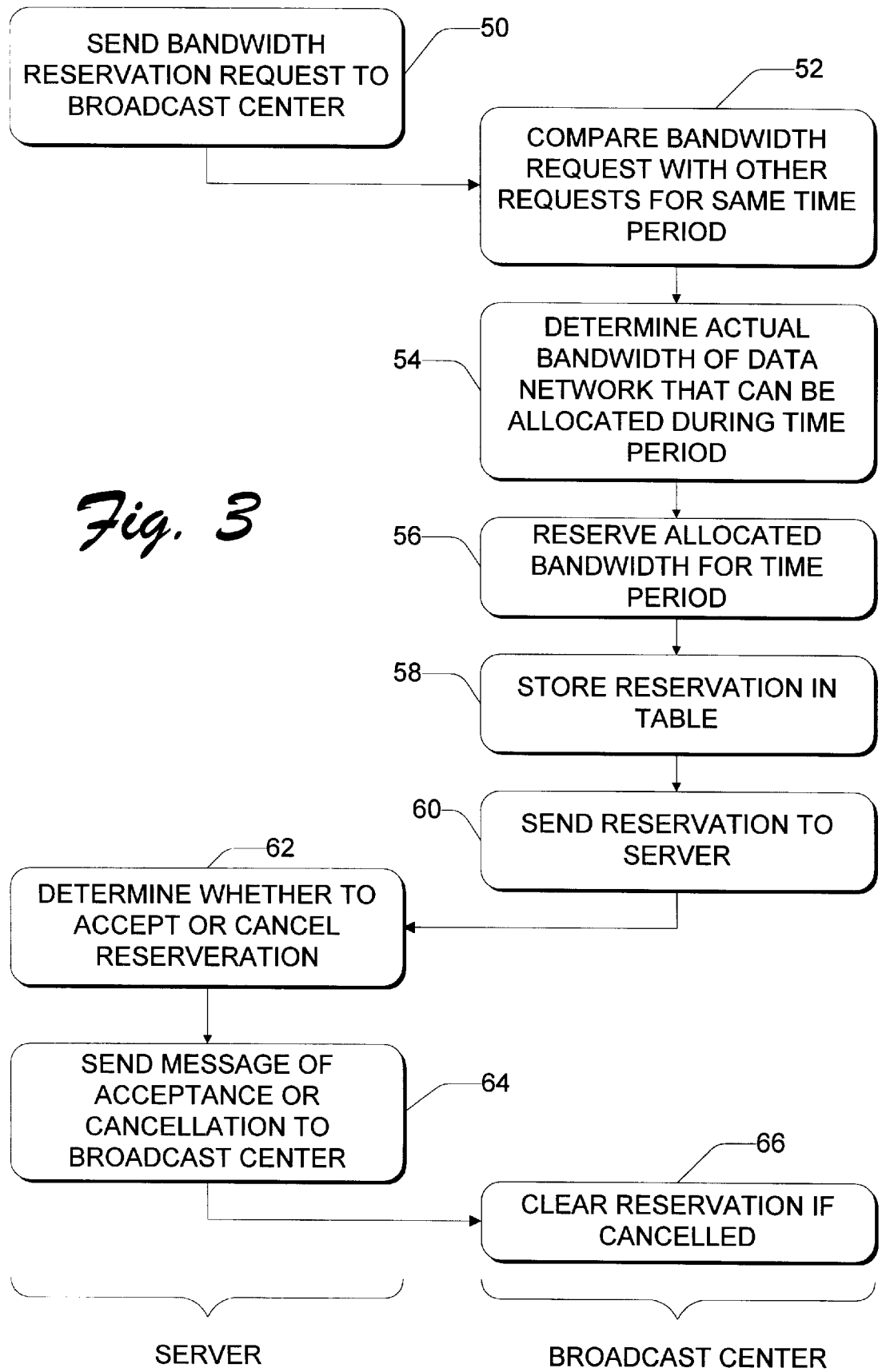

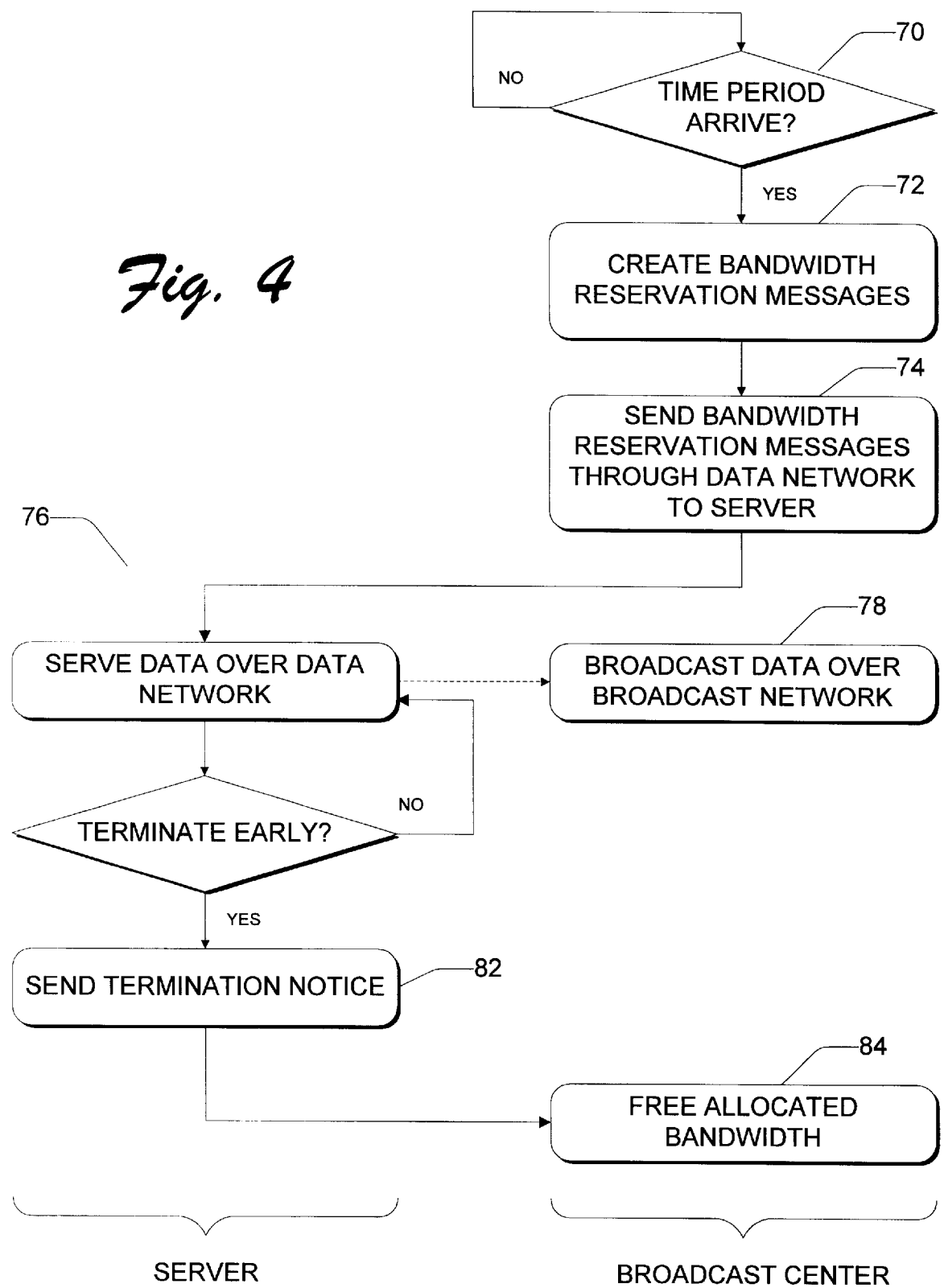

DATA DELIVERY SYSTEM AND METHOD FOR DELIVERING COMPUTER DATA OVER A BROADCAST NETWORK

TECHNICAL FIELD

This invention relates to a data delivery system in which computer data and other content is served from multiple servers to a broadcast center over a bi-directional data network and then broadcast from the broadcast center to multiple clients over a broadcast network.

BACKGROUND OF THE INVENTION

Conventional computer networks are bi-directional, allowing data communication in both directions between the servers and the clients. Transmitting data over these bidirectional data networks has been a mainstay of computer technology for many years and the communication protocols are well-established.

In large networks used to interconnect many servers to many clients, one of the common problems that arises concerns optimal utilization of bandwidth. "Bandwidth" is the amount of data that can be moved through a particular network segment at any one time. The network bandwidth varies according to the technologies used to implement the network, the amount of communication traffic at any one time, the number of clients and servers attached to the network, and other factors. In some networks, the maximum available bandwidth might be approximately homogenous across the entire network. An example of this might be a local area network (LAN) utilized by a small firm or company. In other networks, the maximum available bandwidth might vary broadly. The Internet, for example, is a conglomerate of different networks, with each network having its own associated bandwidth.

Distribution over the data network is usually constrained by the segment with the lowest available bandwidth. Different paths established through the network between a server and client might result in different bandwidth capacities. The fluctuating amount of data traffic also affects the amount of useable bandwidth that is available at any one time on the network. Accordingly, protocols are established to ensure proper delivery of data over the network.

Some forms of bi-directional data networks, such as an Ethernet network, have no explicit method for regulating bandwidth. In such networks, a server sends out a fixed amount of data, typically in a fixed-size data packet, over the network to a client. The client sends back a receipt acknowledgment to inform the server that the data was received. The server's bandwidth is automatically regulated by the receipt acknowledgments from the client. This method of bandwidth regulation has been used for years and is very well known.

Newer types of data networks, such as an ATM (Asynchronous Transfer Mode) network, can limit access to the network bandwidth. Protocols are being developed which allow the client to reserve bandwidth between itself and the server at the time the communication channel is being established to guarantee the availability of adequate bandwidth for data transmission. One example protocol is known as "RSVP," and is explained in an article by Lixia Zhang, Steve Deering, Deborah Estrin, Scott Shenker, and David Zappala, entitled "RSVP: A New Resource ReSerVation Protocol," published in IEEE Network magazine, September 1993. The general concept of client-initiated bandwidth reservation is well known.

Apart from the classic bi-directional data networks, there is an increasing interest in the use of broadcast networks to deliver computer data and other content to clients, akin to the broadcast delivery of television or radio. Broadcast networks are unidirectional in that data flows from the server to the clients, but no return communication is possible over the same communication path. As a result, the common protocols used for two-way communication over a bi-directional networks, such as receipt acknowledgments and RSVP messages, cannot be supported by the broadcast network because the clients are unable to communicate back over the broadcast communication link to the server.

The inventor has developed a system and method which address this problem.

SUMMARY OF THE INVENTION

A data delivery system facilitates broadcast delivery of computer data and other content from multiple content servers to multiple clients. The servers are connected to a broadcast center via a bi-directional data network, such as an ATM network or an Ethernet. The data is served over the data network from the content servers to the broadcast center where it is broadcast over a broadcast network (i.e., satellite, RF, microwave, etc.) to the clients. The clients are equipped to receive broadcast transmissions from the broadcast center.

Due to the unidirectional broadcast link, the clients are unable to communicate with the servers to acknowledge receipt or pre-reserve bandwidth on the data network. The broadcast center performs this task on behalf of the clients. To assure delivery of the data from the servers over the data network to the broadcast center for retransmission, the content servers generate requests for reservation of bandwidth on the data network for an upcoming time period and submit the requests over the data network to the broadcast center prior to the time period. Each bandwidth reservation request specifies a quantity of bandwidth and a time slot desired for data transmission. The broadcast center receives the bandwidth reservation request and compares it to other requests for the same time period. A list of previous bandwidth reservations are kept in a table and categorized according to the requested time periods.

The broadcast center uses the comparison to evaluate whether the bandwidth requested by the content server is available for allocation. The broadcast center determines an actual quantity of bandwidth that can be allocated during the time period based upon the other requests. The actual and requested bandwidths might be the same if there is sufficient bandwidth available at the requested time, or the actual bandwidth available for allocation might be less than the requested bandwidth if there is insufficient bandwidth for the requested time slot. The broadcast center schedules a reservation for the actual amount of bandwidth that can be allocated for the requested time period in the name of the requesting content server. The broadcast center stores the reservation and sends a copy over the data network to the requesting content server, which decides whether to accept or cancel the reservation.

When the time of the bandwidth request arrives, the broadcast center creates bandwidth reservation messages, such as RSVP messages, and sends them through the network routers on the data network between the broadcast center and the content server to reserve the network resources, thereby guaranteeing the availability of the requested bandwidth. In this manner, the broadcast center acts on behalf of the clients to reserve bandwidth for the data transmission over the data network.

The content server serves the data over the data network to the broadcast center during the allotted time period, utilizing the reserved bandwidth. As the data packets are received at the broadcast center, the data packets are converted to a broadcast format and transmitted over the broadcast network.

BRIEF DESCRIPTION OF THE DRAWINGS

FIG. 3 is a flow diagram showing steps in a method for making bandwidth reservations on the data network for an upcoming time slot.

FIG. 4 is a flow diagram showing steps in a method for reserving the bandwidth during a time slot to guarantee resources for delivery of the data from the servers to the broadcast center.

DETAILED DESCRIPTION OF THE PREFERRED EMBODIMENT

Figure 1:
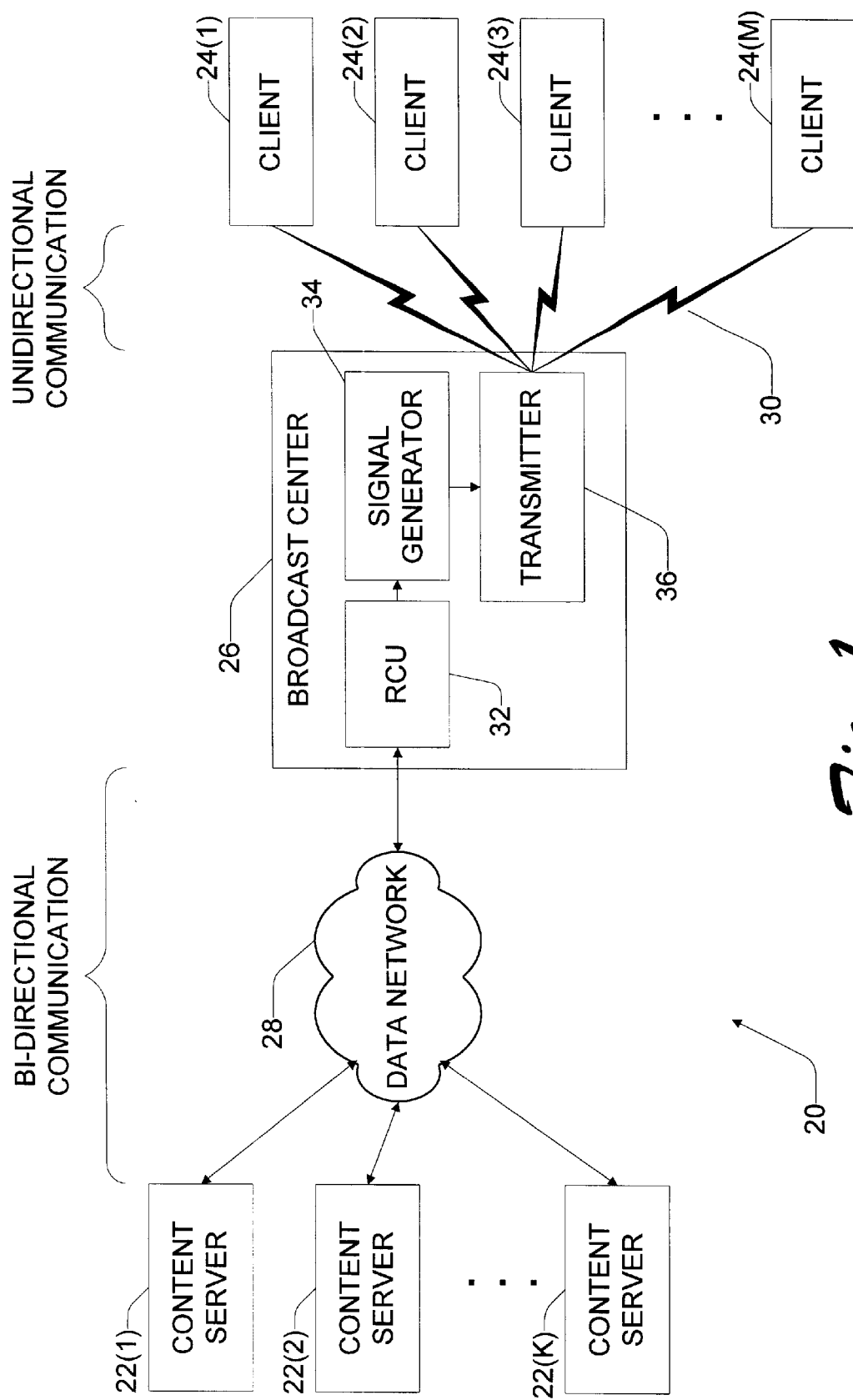
FIG. 1 is a diagrammatic illustration of a data delivery system having a broadcast center which receives data from servers over a bi-directional data network and broadcasts that data over a broadcast network to multiple clients.

FIG. 1 shows a data delivery system 20 for broadcast delivery of computer data and other content from multiple content servers 22(1), 22(2), ..., 22(K) to multiple clients 24(1), 24(2), 24(3), ..., 24(M). The content servers 22(1)–22(K) are connected to a broadcast center 26 via a bi-directional data network 28 which enables two-way communication between the content servers 22(1)–22(K) and the broadcast center 26. The content servers serve data in the form of audio, video, animation, bit maps or other graphics, applications or other executable code, text, hypermedia, or other multimedia types. As an example implementation, the content servers 22(1)–22(K) are implemented as personal computers or workstations running a multitasking, disk-based operating system, such as Windows® NT from Microsoft Corporation. The content servers might also be configured as continuous media file servers which serve data files at a constant data rate. An example construction of a file server comprises a disk array of storage disks, with the data files striped across the storage disks, and one or more servers which cooperate together to serve the data files from the storage disks.

The bi-directional data network 28 represents various types of networks, including the Internet, a LAN (local area network), a WAN (wide area network), and the like. The data network 28 can be implemented in a number of ways, including wire-based technologies (e.g., fiber optic, cable, wire, etc.) and wireless technologies configured for two-way communication (e.g., satellite, RF, etc.). The data network 28 can further be implemented using various available switching technologies (e.g., ATM (Asynchronous Transfer Mode), Ethernet, etc.) and different data communication protocols (e.g., TCP/IP, IPX/SPX, etc.). In such protocols, the data is packaged in individual, fixed byte-size packets which are transmitted separately over the data network. In the preferred implementation described below, the data network 28 is one which allows reservation of bandwidth at the time of data transmission, with one suitable implementation being an ATM network.

The broadcast center 26 receives the data served from the content servers 22(1)–22(K) over the network 28 and broadcasts the data over a broadcast (or multicast) network 30 to the clients 24(1)–24(M). The broadcast network 30 is a unidirectional network in which the data is carried in one direction from the broadcast center 26 to the many clients 24(1)–24(M). The clients are unable to reply or initiate communication to the broadcast center using the broadcast network 30. The clients might still be able to communicate with the broadcast center 26 or content servers 22(1)–22(K) using a different back channel, but this aspect is not shown in the drawings. The broadcast network 30 can be implemented in a variety of ways. For instance, the broadcast network might be implemented as a wireless network configured for one-way transmission (i.e., satellite, radio, microwave, etc.). The broadcast network might also be a network which supports two-way communication, but can be predominately used for unidirectional multicasting from the broadcast center to many clients simultaneously without the clients foreknowledge. Although only one broadcast center 26 is illustrated for explanation purposes, the data delivery system 20 can scale to include multiple broadcast centers coupled between numerous servers 22 and numerous clients 24. The clients 24(1)–24(M) can be implemented in a number of ways, including desktop computers, laptop computers, and computer enhanced television units. As an example implementation, the client is a broadcast-enabled personal computer having a processor (e.g., x86 or Pentium® microprocessor from Intel Corporation), memory, a computer monitor (e.g., VGA, SVGA), and one or more input devices (e.g., keyboard, mouse, etc.). The client includes a digital broadcast receiver (e.g., satellite dish receiver, RF receiver, microwave receiver, etc.) and a tuner which tunes to frequencies of the broadcast network 30. The tuner is configured to receive digital broadcast data in a particularized format, such as MPEG-encoded digital video and audio data, as well as digital data in many different forms, including software programs and programming information in the form of data files. The client runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems which provide windowing environments may be employed, such as the Macintosh operating system from Apple Computer, Inc. and the OS/2 operating system from IBM. One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

The broadcast center 26 includes a reservation computing unit (RCU) 32, a signal generator 34, and a broadcast transmitter 36. The reservation computing unit 32 is coupled to the bi-directional data network 28 to receive the data served over the network from the content servers 22(1)–22 (K). The reservation computing unit 32 is a final node of the data network 28 in which data communication to that point is bi-directional and past that point is unidirectional. Accordingly, the reservation computing unit 32 can communicate with the content servers 22(1)–22(K) over the data network 28. Past the reservation computing unit the unidirectional broadcast link of the delivery system begins. The broadcast link has a guaranteed amount of bandwidth, usually at a known, fixed rate.

Data is received at the reservation computing unit 32 and converted from the network packet format to a format appropriate for broadcast transmission. The signal generator 34 generates a broadcast signal with the data embedded thereon to carry the data over the broadcast network 30. The broadcast signal is passed to the transmitter 36 where it is broadcast over the broadcast network 30 to the clients 24(1)–24(M).

Figure 2:
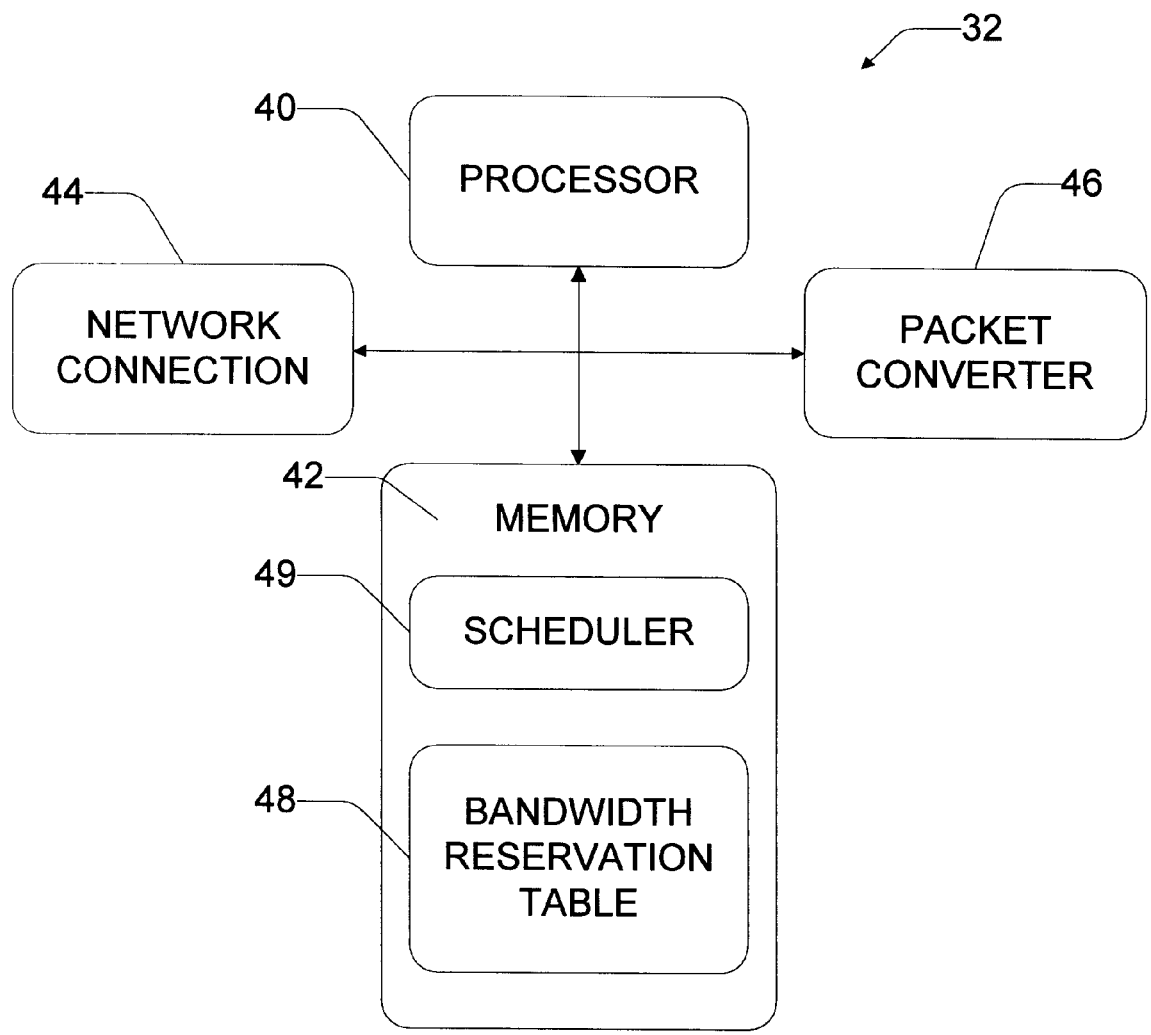
FIG. 2 is a block diagram of a reservation computing unit located at the broadcast center.

FIG. 2 shows the reservation computing unit 32 in more detail. It includes a processor 40 (e.g., x86 or Pentium® microprocessor from Intel Corporation) and memory 42 (e.g., ROM, RAM, disk drive, floppy disk drive, CD-ROM, etc.). As an example implementation, the reservation computing unit 32 can be implemented as a personal computer or workstation running a multitasking, disk-based operating system, such as Windows® NT from Microsoft Corporation. The reservation computing unit 32 is configured to function as a bridge-router between the traditional data network 28 and the broadcast network 30. A bridge-router is capable of supporting video and audio broadcast transmission.

The reservation computing unit 32 is also equipped with a network connection 44 for providing access to the data network 28. A packet converter 46 is incorporated into the reservation computing unit 32 to convert the data packets received from the data network (e.g., IP packets, Ethernet packets, etc.) into a different form for broadcast transmission. For instance, the packet converter 46 might convert the data packets into an NABTS-compatible format (North American Basic Teletext Specification) or other television standard for transmission as part of the television signal (e.g., as part of the vertical blanking interval), or into conventional 147-byte DSS (Digital Satellite System) packets for transmission over a satellite system.

One of the functions of the reservation computing unit 32 is to reserve bandwidth on the data network 28 on behalf of the clients 24(1)–24(M), acting essentially as a client surrogate computing unit. Under existing network communication protocols, a client must either acknowledge receipt of data sent over the network from the server or reserve bandwidth on the network between itself and the server at the time the communication channel is being established. Due to the unidirectional broadcast link 30, however, the clients 24(1)–24(M) are unable to communicate with the servers 22(1)–22(K) to acknowledge receipt or pre-reserve bandwidth over the data network 28. Accordingly, the reservation computing unit 32 performs this task for the clients.

In general, the content servers 22(1)–22(K) generate requests for reservation of bandwidth on the data network 28 for an upcoming time period and submit the requests over the data network 28 to the reservation computing unit 32 before the time period. The reservation computing unit 32 is configured to schedule reservation of the bandwidth for the upcoming time period and, when the time period arrives, to reserve the bandwidth at the time the communication link between the server and the reservation computing unit 32 is being established.

The bandwidth reservation requests received from the servers are stored in memory 42 in a bandwidth reservation table 48. A scheduler 49 is implemented at the reservation computing unit 32 to schedule the bandwidth reservation requests. The scheduler 49 compares the incoming requests with others stored in the table 48 for the same time slot and determines whether the bandwidths requested by the content servers 22(1)–22(K) can be accommodated at the requested time slots. If they can, the scheduler 49 reserves the bandwidths at the corresponding time slots for the content servers. The scheduler 49 is shown implemented as a software program which is stored in memory 42 and executed on processor 40.

FIGS. 3 and 4 show steps in a method for delivering data over the data network 28 from servers 22(1)–22(K) to the broadcast center 26 for broadcast over the unidirectional broadcast network 30 to the clients 24(1)–24(M). FIG. 3 shows the steps performed by the content servers 22(1)–22(K) and the broadcast center 26 during the scheduling of reservations prior to the time period when the network bandwidth is desired. FIG. 4 shows the steps performed by the servers and broadcast center to establish a data network path having the reserved bandwidth and to serve data over that path during the time period. The method of FIGS. 3 and 4 is described with reference to FIGS. 1 and 2.

For purposes of explanation, suppose content server 22(1) desires to reserve a selected quantity of bandwidth on the data network 28 to serve data during a selected time period. The data network 28 has sufficient bandwidth to service all requests from the servers 22(1)–22(K) and more bandwidth than the maximum output of the broadcast center 26 over the broadcast network 30. Preferably, the data network 28 has twice as much bandwidth as the broadcast network in order to accommodate both the data being served for broadcast as well as the internal, non-broadcast, communication among the servers and broadcast center.

At step 50 in FIG. 3, the requesting content servers 22(1) sends a bandwidth reservation request over the data network 28 to the broadcast center 26. The bandwidth reservation request specifies a quantity of bandwidth and a time slot desired for data transmission. The bandwidth can be specified as a data rate in bytes per second and the time slot can be identified by a starting time and an ending time, although other specification parameters are possible. The bandwidth reservation request also contains identification of the requesting content server 22(1). The bandwidth reservation request is transmitted in a network compatible packet having a network address of the broadcast center 26.

At step 52 in FIG. 3, the reservation computing unit 32 at the broadcast center 26 receives the bandwidth reservation request and compares it to other requests for the same time period. Table 48 contains a list of previous bandwidth reservations for particular time periods. The table entries specify the server ID of the content server, the bandwidth requested and the bandwidth allocated, and the time period when the data transmission is to occur. The reservation computing unit 32 compares the newest request to the reservations which have already been scheduled for the same or overlapping time periods.

The reservation computing unit 32 uses the comparison to evaluate whether the bandwidth requested by the content server 22(1) is available for allocation. In the implementation of FIG. 3, the reservation computing unit 32 determines an actual quantity of bandwidth that can be allocated during the time period based upon the other requests (step 54 in FIG. 3). The actual and requested bandwidths might be the same if there is sufficient bandwidth available at the requested time. Alternatively, the actual bandwidth available for allocation might be less than the requested bandwidth if there is insufficient bandwidth for the requested time slot.

At step 56 in FIG. 3, the scheduler 49 of reservation computing unit 32 makes a reservation for the actual amount of bandwidth that can be allocated for the requested time period in the name of the requesting content server 22(1). The scheduler 49 stores the reservation in the table 48 (step 58 in FIG. 3) and sends a copy over the data network 28 to the requesting content server 22(1) (step 60 in FIG. 3).

In another implementation, the results of the comparison evaluation performed by the reservation computing unit might dictate whether to reserve the bandwidth at all. For instance, the reservation computing unit 32 might schedule a reservation if there is sufficient bandwidth available for allocation at the requested time slot, and forego making a reservation if there is insufficient bandwidth to service the request. Alternatively, the reservation computing unit 32 might attempt to find a different time slot that can accommodate the bandwidth requested as a possible alternative and suggest that different time slot to the server.

In yet another implementation, the requesting content server 22(1) might request bandwidth based on the number of bytes of data to be sent and a maximum rate at which the data is to be fed to the network 28. The reservation computing unit 32 can then present a list of rates and their corresponding start and stop times. The list reflects the variable amount of bandwidth available at any time due to the bandwidths and transmission time periods that have already been requested and reserved by other servers.

At step 62 in FIG. 3, the content server 22(1) determines whether to accept or cancel the reservation. If the reservation is for bandwidth and time slot requested, the content server 22(1) is likely to accept the reservation, unless the content server 22(1) has since decided not to transmit the data. On the other hand, the content server 22(1) may decide to cancel the reservation if the reservation is not for the full amount of bandwidth requested for the desired transmission time. The content server 22(1) sends a message to the broadcast center 26 which accepts or cancels the reservation (step 64 in FIG. 3). If the message contains a cancellation notice, the broadcast center cancels the reservation, deleting it from the table 48 (step 66 in FIG. 3). This cancellation frees up the bandwidth for other servers to reserve.

At this point, the reservation computing unit 32 has reserved bandwidth for an upcoming time period in which the content server 22(1) is to send data that will be broadcast over the broadcast network 30 to clients 24(1)–24(M). To continue the example, suppose that the time period is about to arrive. At step 70 in FIG. 4, the reservation computing unit 32 at the broadcast center 26 monitors the arrival of the time period. When the time of the bandwidth request arrives, the reservation computing unit 32 creates bandwidth reservation messages (step 72 in FIG. 4). As an example, these bandwidth reservation messages can be standard RSVP messages, as explained in an article by Lixia Zhang, Steve Deering, Deborah Estrin, Scott Shenker, and David Zappala, entitled "RSVP: A New Resource ReSerVation Protocol," published in IEEE Network magazine, September 1993, which is hereby incorporated by reference. The reservation computing unit 32 sends the reservation messages through the network routers on network 28 between the broadcast center 26 and the content server 22(1) (step 74 in FIG. 4). In this manner, the reservation computing unit 32 acts as a surrogate client on behalf of the clients 24(1)–24(M) to reserve bandwidth for the data transmission because the clients cannot directly contact the content server 22(1) on the network path that connects the server 22(1) to the broadcast center 26.

At step 76 in FIG. 4, the content server 22(1) begins serving the data over the data network 28 to the broadcast center 26. The data is served during the allotted time period, and utilizes the reserved bandwidth. As the data packets are received at the broadcast center 28, the packet converter 46 of the reservation computing unit 32 converts the network packets to a broadcast format. The signal generator 34 then generates a broadcast signal carrying the data and the transmitter 36 transmits the broadcast signal over the broadcast network 30 to the clients 24(1)–24(M) (step 78 in FIG. 4).

If the content server 22(1) completes data transmission before the end of the time period, or decides to prematurely terminate serving the data, the content server 22(1) sends a termination notice to the broadcast center indicating that it no longer wants the bandwidth (steps 80 and 82 in FIG. 4). The reservation computing unit 32 frees the allocated bandwidth in response to the termination notice so that the bandwidth may be used or reserved for other content servers (step 84 in FIG. 4).

The content servers 22(1)–22(K) may periodically request information about the availability of bandwidth over a period of time. The reservation computing unit 32 responds back with the highest common bandwidth that can be guaranteed over the entire period. It is also noted that one content server can reserve bandwidth, or allocate a portion of its reserved bandwidth, to another server. Either server is thereafter allowed to cancel the request or use of the bandwidth.

If the data network is implemented using technology that does not support bandwidth reservation messages, such as RSVP messages, the reservation computing unit 32 foregoes sending out such messages (i.e., steps 72 and 74 in FIG. 4). Instead, the content servers 22(1)–22(K) regulate their own bandwidth and the reservation computing unit 32 regulates total usage of the network (as above). The reservation computing unit 32 sends out self-regulation messages to the servers directly, regardless of the router path, to manage the bandwidth allocation during usage. The content servers 22(1)–22(K) use the self-regulation messages to regulate their own transmissions. Another way is to use RAMP (Reliable Adaptive Multicast Protocol) between the content servers 22(1)–22(K) and the reservation computing unit 32 which automatically self regulates. The reservation computing unit 32 strips off the RAMP layer and forwards the raw multicast portion.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data delivery system for delivering data over a unidirectional broadcast network, comprising:

multiple content servers connected to serve data over a bi-directional data network;

a broadcast center connected to receive the data served from the content servers over the bi-directional data network and to broadcast the data over the unidirectional broadcast network to multiple clients;

the content servers generating requests for reservation of bandwidth on the data network for an upcoming time period and submitting the requests over the data network to the broadcast center before the time period; and the broadcast center reserving the bandwidth for the content servers in response to the requests.

2. A data delivery system as recited in claim 1, wherein the broadcast center evaluates whether the bandwidth requested by the content servers is available for allocation and reserves the bandwidth if it is available for allocation.

3. A data delivery system as recited in claim 1, wherein the broadcast center maintains a list of bandwidth reservations for the content servers.

4. A data delivery system as recited in claim 1, wherein:

a particular content server submits a bandwidth reservation request for a particular quantity of bandwidth during a particular time period; and the broadcast center compares the bandwidth reservation request to other requests involving the time period and determines an actual quantity of bandwidth that can be allocated during the time period.

5. A data delivery system as recited in claim 4, wherein the broadcast center reserves the actual quantity of bandwidth for the time period for allocation to the particular content server.

6. A data delivery system as recited in claim 5, wherein:

the broadcast center sends the reservation to the particular content over the data network; and the particular content server determines whether to accept or cancel the reservation.

7. A data delivery system as recited in claim 1, wherein, for a particular time period, the broadcast center sends bandwidth reservation messages over the data network to reserve the bandwidth on the data network to assure delivery of the data from the content servers to the broadcast center.

8. A data delivery system as recited in claim 1, wherein the broadcast center comprises:

a reservation computing unit coupled to the bi-directional data network to handle the bandwidth reservation requests from the content servers;

a signal generator to generate a broadcast signal to carry the data served from the content servers over the broadcast network; and a transmitter coupled to the signal generator to send the broadcast signal over the broadcast network.

9. A broadcast center for receiving data from multiple content servers over a bi-directional data network and broadcasting that data over a broadcast network to multiple clients, comprising:

a reservation computing unit which receives bandwidth reservation requests from the content servers, each bandwidth reservation request specifying a quantity of bandwidth and a time slot in which a requesting content server desires to serve data over the data network for broadcast by the broadcast center;

the reservation computing unit determining whether the quantity of bandwidth requested can be accommodated, and if so, reserving the bandwidths at corresponding time slots requested by the content servers;

a signal generator to generate a broadcast signal carrying the data served by the content servers; and a transmitter, coupled to the signal generator, to broadcast the broadcast signal over the broadcast network to the clients.

10. A broadcast center as recited in claim 9, wherein the reservation computing unit comprises a router.

11. A broadcast center as recited in claim 9, wherein the reservation computing unit notifies the content servers of the reserved bandwidths.

12. A broadcast center as recited in claim 9, wherein the reservation computing unit evaluates whether the bandwidths requested by the content servers are available for allocation.

13. A broadcast center as recited in claim 9, wherein the reservation computing unit compares the bandwidth reservation requests for a particular time slot and determines an actual quantity of bandwidth that can be allocated to the content servers.

14. A broadcast center as recited in claim 13, wherein the reservation computing unit reserves the actual quantity of bandwidth for the time slot.

15. A broadcast center as recited in claim 9, wherein the reservation computing unit sends bandwidth reservation messages at reserved time slots to particular ones of the content servers to reserve bandwidth on the bi-directional data network between the particular content servers and the reservation computing unit.

16. A broadcast center as recited in claim 9, wherein the reservation computing unit converts data received in a first format from the content servers into a second format which is passed onto the signal generator.

17. In a network system having multiple content servers serving data to multiple clients over a distribution network with a bi-directional link and a unidirectional broadcast link, the content servers sending the data over the bi-directional link in a first format, a reservation computing unit comprising:

a network port to provide access to the bi-directional link of the distribution network, the network port receiving bandwidth reservation requests from the content servers requesting reservation of bandwidth on the data network;

a scheduler to schedule bandwidth reservations for the content servers in response to the requests;

a second port to provide access to the unidirectional broadcast link of the distribution network; and a data format converter to convert the data from the first format into a second format for transmission over the unidirectional broadcast link of the distribution network.

18. A reservation computing unit as recited in claim 17, wherein the scheduler generates reservation notices to inform the content servers that the bandwidths are reserved, the network port transmitting the reservation notices to the content servers over the bi-directional link of the distribution network.

19. A reservation computing unit as recited in claim 17, wherein the scheduler evaluates whether the bandwidths requested by the content servers are available for allocation.

20. A reservation computing unit as recited in claim 17, further comprising a bandwidth reservation table to store the bandwidth reservations.

21. A reservation computing unit as recited in claim 20, wherein the scheduler compares individual bandwidth reservation requests to the reservations stored in the bandwidth reservation table for a time slot and determines an actual quantity of bandwidth that can be allocated for the requesting content servers during that time slot.

22. A reservation computing unit as recited in claim 21, wherein the scheduler reserves the actual quantity of bandwidth for the time slot.

23. A reservation computing unit as recited in claim 17, wherein during a particular time slot, the scheduler generates bandwidth reservation messages which are sent by the network port over the bi-directional link of the distribution network to particular content servers to reserve bandwidth on the distribution network between the particular content servers and the reservation computing unit.

24. In a data delivery system in which data is delivered from a server to a client at least partly over a unidirectional broadcast network in which the client is unable to communicate with the server to reserve bandwidth for the data delivery, a client surrogate computing unit interposed between the server and the client and capable of conducting bi-directional communication with the server, the client surrogate computing unit being configured to reserve bandwidth on behalf of the client for the data delivery from the server to the client and to convert the data received from the server into a format for broadcast delivery of the data over the unidirectional broadcast network.

25. In a data delivery system in which data from multiple content servers is sent over a data network to a broadcast center for broadcast over a unidirectional broadcast network to multiple clients, a method comprising the following steps:

generating, at a requesting content server, a bandwidth reservation request for reservation of bandwidth on the data network for an upcoming time period;

sending the bandwidth reservation request over the data network to the broadcast center before the time period;

reserving the bandwidth on the data network for the time period requested by the requesting content server;

sending the data from the requesting content server over the data network to the broadcast center; and broadcasting the data from the broadcast center over a unidirectional broadcast network to the multiple clients.

26. A method as recited in claim 25, further comprising the step of evaluating, at the broadcast center, whether the bandwidth requested by the requesting content server is available for allocation.

27. A method as recited in claim 25, further comprising the step of storing the bandwidth reservation request at the broadcast center.

28. A method as recited in claim 25, further comprising the following steps:

comparing the bandwidth reservation request with other requests for the time period; and determining an actual quantity of bandwidth that can be allocated to the requesting content server during the time period.

29. A method as recited in claim 28, further comprising the following steps:

reserving the actual bandwidth for the requesting content server;

sending a reservation for the actual bandwidth from the broadcast center to the requesting content server over the data network; and determining, at the requesting content server, whether to accept or cancel the reservation.

30. A method as recited in claim 25, further comprising the step of initiating from the broadcast center, at commencement of the time period, a bandwidth reservation message for reserving the bandwidth on the data network to assure delivery of the data from the content server to the broadcast center.

31. Computer-readable media having computer-executable instructions executable at the broadcast center and the content servers for performing the steps of the method as recited in claim 25.

32. In a data delivery system in which data from multiple content servers is sent over a data network to a broadcast center for broadcast over a broadcast network to multiple clients, a method for operating the broadcast center comprising the following steps:

reserving, in advance, bandwidth on the data network to be used by a content server to send data over the data network during an upcoming time period;

before commencement of the time period, generating bandwidth reservation messages and sending the bandwidth reservation messages over the data network to the content servers to timely reserve network resources to assure transmission of the data from the content servers to the broadcast center during the time period;

receiving the data from the content server over the data network during the time period; and broadcasting the data from the broadcast center over a unidirectional broadcast network to the multiple clients.

33. A method as recited in claim 32, further comprising the following steps:

receiving a bandwidth reservation request from the content server requesting reservation of a quantity of bandwidth at a particular time period; and evaluating whether the quantity of bandwidth requested by the content server is available for allocation.

34. A method as recited in claim 32, further comprising the following steps:

receiving a bandwidth reservation request from the content server requesting reservation of a quantity of bandwidth at a particular time period; and comparing the bandwidth reservation request with other bandwidth reservation requests for the particular time period to determine an actual quantity of bandwidth that can be allocated to the requesting content server.

35. A method as recited in claim 32, further comprising the following steps:

receiving multiple bandwidth reservation requests from multiple content servers requesting reservation of bandwidth at different time periods; and storing the bandwidth reservation requests.

36. A computer programmed to perform the steps recited in the method of claim 32.

37. A computer-readable medium having computer-executable instructions for performing the steps of the method as recited in claim 32.

* * * * *